US009471155B2

(12) United States Patent
Phan

(10) Patent No.: US 9,471,155 B2
(45) Date of Patent: Oct. 18, 2016

(54) 3-DIMENSIONAL HUMAN INTERFACE DEVICE

(71) Applicant: Daniel Sern Hong Phan, Bayan Lepas (MY)

(72) Inventor: Daniel Sern Hong Phan, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,038

(22) PCT Filed: Jun. 26, 2013

(86) PCT No.: PCT/US2013/047816
§ 371 (c)(1),
(2) Date: Dec. 17, 2013

(87) PCT Pub. No.: WO2014/105183
PCT Pub. Date: Jul. 3, 2014

(65) Prior Publication Data
US 2015/0193012 A1    Jul. 9, 2015

(51) Int. Cl.
*G06F 3/03*     (2006.01)
*G06F 1/16*     (2006.01)
*G06F 3/041*    (2006.01)
*G06F 3/0488*   (2013.01)
*G06F 3/01*     (2006.01)

(52) U.S. Cl.
CPC ............. *G06F 3/03* (2013.01); *G06F 1/169* (2013.01); *G06F 1/1643* (2013.01); *G06F 3/011* (2013.01); *G06F 3/041* (2013.01); *G06F 3/04886* (2013.01); *G06F 2203/04108* (2013.01)

(58) Field of Classification Search
CPC .. G06F 1/1643; G06F 1/169; G06F 3/04886; G06F 2203/04108; G06F 3/03; G06F 3/041; G06F 3/017; G06F 3/011; G09G 5/08; G01C 17/38
See application file for complete search history.

(56) References Cited

U.S. PATENT DOCUMENTS

2005/0012720 A1*  1/2005  Pryor ........................... 345/168
2007/0211031 A1*  9/2007  Marc ..................... G06F 3/0304
                                                    345/163
2009/0139778 A1*  6/2009  Butler et al. ............... 178/18.03

FOREIGN PATENT DOCUMENTS

KR      10-1098015 B1    12/2011
WO      2007/066953 A1    6/2007

OTHER PUBLICATIONS

International Search Report and Written Opinion received for PCT Patent Application No. PCT/US2013/047816, mailed on Oct. 14, 2013, 12 Pages.
Leap Motion, Inc., "Leap Motion Unveils World's Most Accurate 3-D Motion Control Computing," May 21, 2012, 3 Pages. https://www.leapmotion.com/press_releases/leap-motion-unveils-world-s-most-accurate-3-d-motion-control-technology-for-computing.
Oh, et al., "Finger Gesture-based Three-Dimension Mobile User Interface Using a Rear-facing Camera," In: Proceedings of International Conference on Information Science and Technology 2012, Apr. 28-30, 2012, pp. 117-119.

* cited by examiner

*Primary Examiner* — Lun-Yi Lao
*Assistant Examiner* — Johny Lau
(74) *Attorney, Agent, or Firm* — Douglas J. Ryder; Ryder, Lu, Mazzeo & Konieczny LLC

(57) ABSTRACT

In general, in one aspect, a laptop computer includes two planes of orthogonal proximity sensors that are utilized to create a three dimensional user interface. The planes of proximity sensors are provided in the display and the keyboard. The intersections of the proximity sensors along three axis defines a plurality of coverage areas. An object (e.g., users finger, pointer) is determined to be within a coverage area if the corresponding intersecting proximity sensors indicate presence of the object. A user may identify an item on the display for selection by placing an object within an appropriate coverage area and select the item by moving the object toward the display. A user may identify an action to be taken on the display by moving an object through one or more of the coverage areas. A 3D image of an object may be generated based on the coverage areas indicating the object is located therein. The 3D image may utilized to authenticate a user.

31 Claims, 4 Drawing Sheets

3-DIMENSIONAL HUMAN INTERFACE DEVICE

BACKGROUND

Users interact with consumer electronic devices (CEDs) in various different manners. A user may interact with a CED using a remote device that is not connected to the CED but that communicates with the CED. For example, the remote device may be a remote control, a wireless mouse, a wireless keyboard, or a gaming controller. The user may interact with devices (e.g., keyboards, touchpad) that are part of or are connected to the CED. The CED may include a display that is touch sensitive so that the user may interact with the CED may touching the display. The various user interfaces are two-dimensional this limiting the type of interactions that may occur with the CED.

BRIEF DESCRIPTION OF THE DRAWINGS

The features and advantages of the various embodiments will become apparent from the following detailed description in which.

DETAILED DESCRIPTION

Figure 1A:
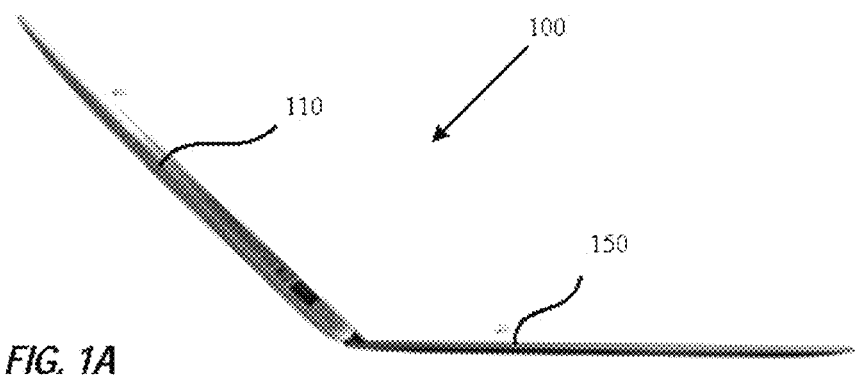
FIGS. 1A-C illustrate various views of an example laptop computer.
Figure 1B:
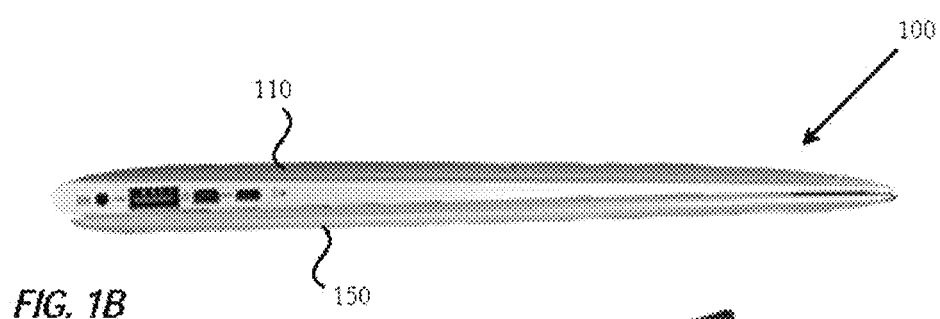
Figure 1C:
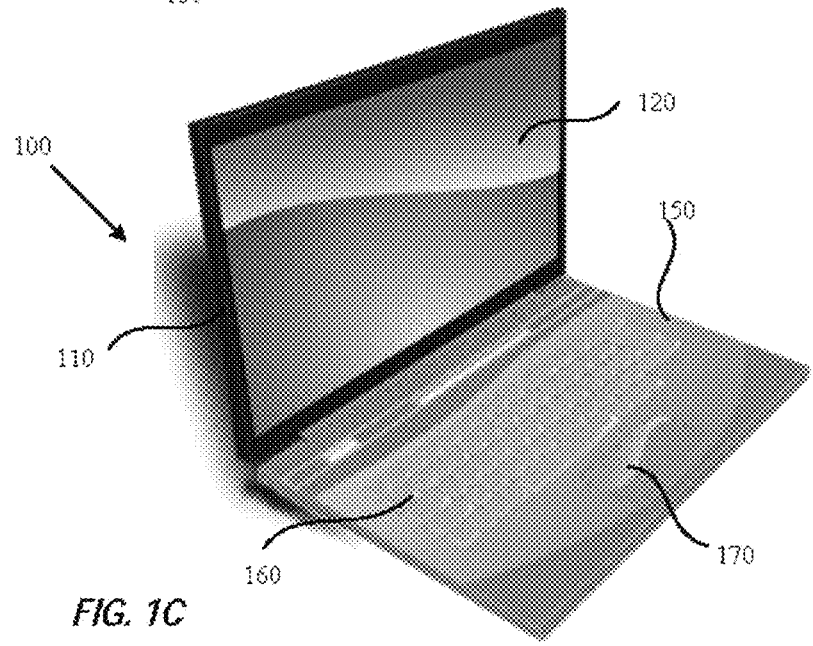

FIGS. 1A-C illustrate various views of an, example laptop computer 100. The computer 100 includes an upper frame (lid) 110 and a lower frame (base) 150 that are pivotally connected to one another other via a hinge or the like (not numbered). The computer 100 may switch between an open configuration where the lid 110 extends in an upward direction from the base 150 to a closed configuration where the lid 110 lays on top of the base 150. The lid 110 may include a display 120 where content can be viewed by a user. The base 150 may include one or more user interfaces to interact with the computer 100. The user interfaces may include, for example, a keyboard 160 and a touchpad 170. When the computer 100 is operational it may be in the open configuration (see FIGS. 1A and 1C) and when the computer is off and/or being transported it may be in the closed configuration (see FIG. 1B).

When the computer 100 is operational a user interacts with the computer 100 via the user interfaces. The keyboard 160 may enable the user to, for example, enter data and/or select certain parameters using the keys. The touchpad 170 may enable the user to, for example, scroll around the display 120 in order to view and/or select certain content, by moving their finger therearound (e.g., detected finger movements may be mapped to screen movements). Whether using the keyboard 160, the touchpad 170, or other user interface devices (e.g., mouse) the interaction is limited to a two-dimensional (2D) interaction (the user interaction is limited to the plane of the display 120). For example, the user may move left, right, up, down, and combinations thereof such as diagonals.

Making the display 120 a touchscreen display like those utilized in tablet, computers would provide additional user interface options. However, such a device would still only provide a 2D user interface (device where user may only interact with the display in the plane of the display).

Proximity sensors may detect if an object is with a certain distance thereof. For example, a proximity sensor utilized on a computer may detect if a human is within normal operating distance (e.g., 3 feet) thereof. However, the proximity sensor may not be able to determine the exact distance the human is from the computer (e.g., 1 foot versus 3 feet). The proximity sensors could be, for example, inductive sensors, capacitive sensors, magnetic sensors, photoelectric sensors, other types of sensors or some combination thereof. The photoelectric sensors may include a light source (e.g., infrared light) and a receiver to determine if the light is reflected back.

Proximity sensors could be utilized in the display 120 to detect location and/or movement of the user (or particular part of the user such as hand or finger) with respect to the display 120 without the need to touch the display 120 or utilize the user, interface devices (e.g., keyboard 160, touchpad 170). However, in order to select certain content or take certain actions the user may need to touch the display 120 and/or utilize the user interface devices (e.g., keyboard 160, touchpad 170). That is, interfacing with such a device is still, limited to 2D interactions.

Figure 2:
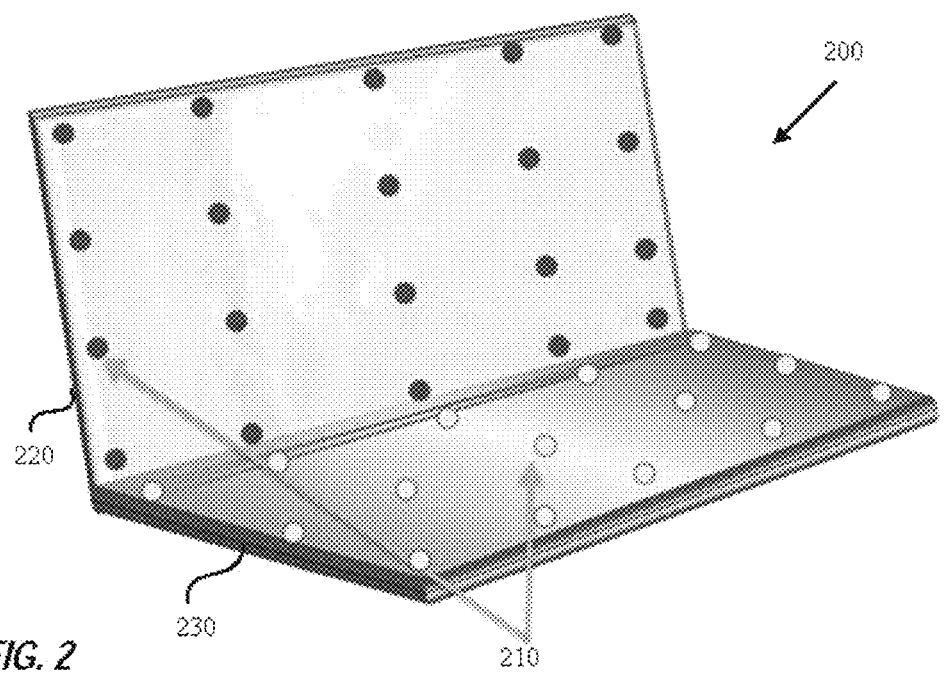
FIG. 2 illustrates an example laptop computer that uses proximity sensors in the lid (display) and the base (user interface), according to one embodiment.

FIG. 2 illustrates an example laptop computer 200 that uses proximity sensors 210 in the lid (display) 220 and the base (user interface) 230. The proximity sensors 210 could be, for example, inductive sensors, capacitive sensors, magnetic sensors, photoelectric sensors, other types of sensors or some combination thereof. The proximity sensors 210 are illustrated as being visible for ease of description. However, the proximity sensors 210 may not be visible and/or may not be noticeable to the user. The proximity sensors 210 may not affect the contents presented on the display 220 and may not affect the user utilizing the user interface (keyboard) 330.

The proximity sensors 210 may be organized as arrays that include rows and columns of sensors 210 that extend across the length and height of the display 220 and length and depth of the user interface (keyboard) 230. The columns of sensors 210 on the display 220 may be aligned with the columns of sensors 210 on the keyboard 230. Utilizing two separate planes of sensors 210 enables the computer 200 to not only detect location and/or movement of the user (or particular part of the user such as hand or finger) or device with respect to the display 220 but also the distance away from the display.

Figure 3:
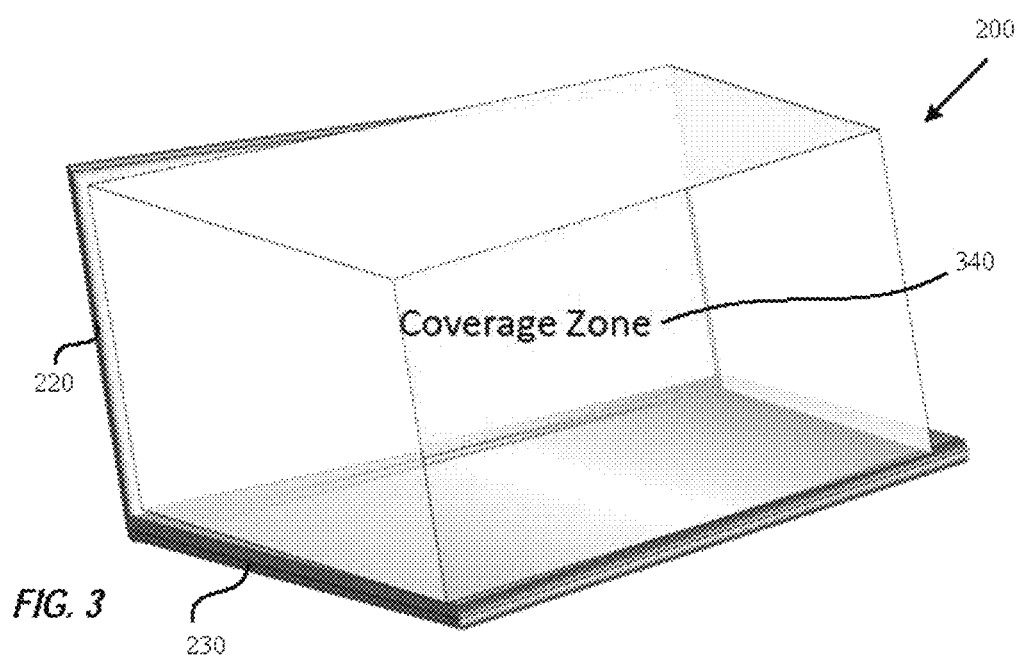
FIG. 3 illustrates an example coverage zone created for the laptop computer by the proximity sensors, according to one embodiment.

FIG. 3 illustrates an example coverage zone 340 created for the laptop computer 200. The proximity sensors 210 on the display 220 may be capable of detecting objects approximately a distance equal to, or slightly greater than, the distance the keyboard 230 extends from the display 220. The proximity sensors 210 on the keyboard 230 may be capable of detecting objects approximately a distance equal to, or slightly greater than, the distance the display 220 extends from the keyboard 230. The coverage zone 340 may be the area where the sensors 210 on the display 220 overlap in coverage with the sensors 210 on the keyboard 230. That is, the coverage area 340 may extend up as high as the display 220, extend out as far as the keyboard 230, and capture the length of the display 220 and keyboard 230.

Figure 4:
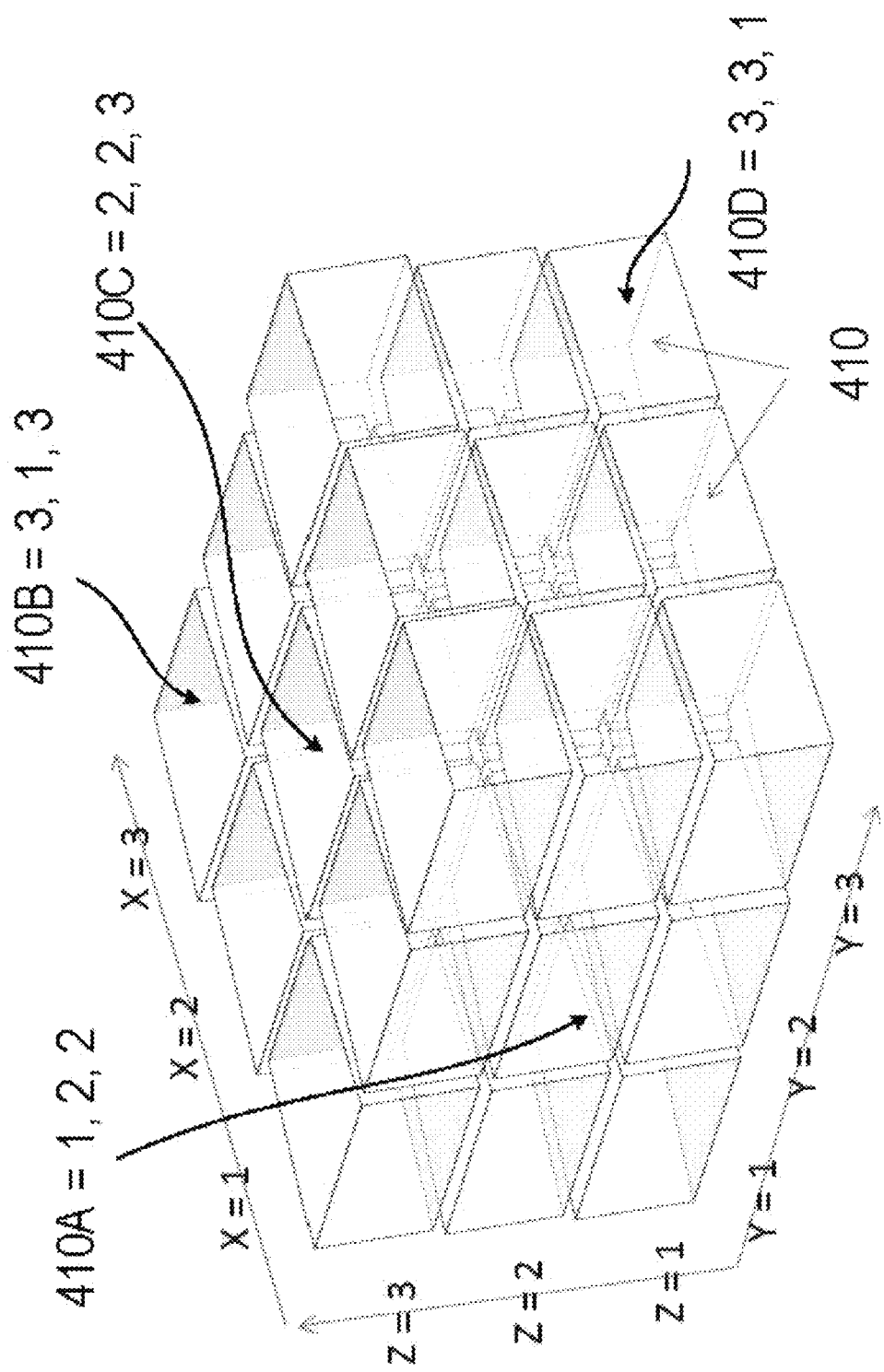
FIG. 4 illustrates the creation of example defined areas e.g., boxes) within the coverage zone, according to one embodiment.

FIG. 4 illustrates the creation of example defined areas (e.g., boxes) 410 within the coverage zone 340. The proximity sensors (not illustrated) may be orientated on the x-axis (length of display) and the z-axis (height of display) for the display (not illustrated). The proximity sensors may be orientated on the x-axis (length of keyboard) and the y-axis (depth of keyboard) for the keyboard (not illustrated). The sensors on the x-axis for the display and the keyboard may be aligned with each other. Each defined area may be centered around an intersection of a proximity sensor for each of the axis. The size of the area may be based on the number of sensors and the proximity of the sensors to each other. As illustrated, there are three areas defined for each axis (e.g., x=1-3, y=1-3, and z=1-3) indicating that there are three sensors associated with each axis. Accordingly, the display and the keyboard may each have 9 sensors associated therewith (3×3). There may be a total of 27 (3×3×3) defined areas.

By way of example, a defined area 410A may be centered around the intersection of the proximity sensors at locations x=1 (first aligned column), y=2 (second row on keyboard) and z=2 (second row on display). A defined area 410B may include proximity sensors at locations x=3 (third aligned column), y=1 (first row on keyboard) and z=3 (third row on display). A defined area 410C may include proximity sensors at locations x=2 (second aligned column), y=2 (second row on keyboard) and z=3 (third row on display). A defined area 410D may include proximity sensors at locations x=3 (third aligned column), y=3 (third row on keyboard) and z=1 (first row on display).

If the three proximity sensors associated with the defined area indicate the presence of an item (e.g., finger, stylus) the computer may determine an object is located in that defined area. The defined areas may be associated with content that, is presented on a corresponding region of the display. According to one embodiment, the proximity sensors on the x-axis and the z-axis may be utilized to define the area on the display. For example, an icon for a particular program may be associated with a defined area. If a finger, hand or other device is determined to be present, in the defined area the icon may be illuminated and if the user wants to select the icon they may make a movement towards the display to select the icon.

According to one embodiment, the proximity sensors on the three axis' may be utilized to assign items on the display to defined areas. For example, if the display presented a 3D desktop the various items on the desktop could be associated with the different defined areas. For example, items in the upper right hand corner of the display may be associated with the proximity sensors in column x=3 and row z=3. An item in the upper right hand corner of the 3D desktop appearing closet to the user (e.g., first of three overlapping icons) may be associated with row y=3, an item appearing a middle distance from the user (e.g., second of three overlapping icons) may be associated with row y=2, and an item appearing furthest distance from the user (e.g., third of three overlapping icons) may be associated with row y=1. If a finger, hand or other device is determined to be present in the defined area the icon may be illuminated. If the user wants to select the icon they may make a defined movement (e.g., gesture towards the display) to select the icon.

In addition to selecting icons from the desktop, the proximity sensors could be utilized to track movements related to the display similar to the way a touch screen and/or touchpad does but without the need to actually interface with the device. For example, if the user wanted to flip pages on a book they were viewing on the display they could swipe their finger from right to left to advance a page or left to right to go back a page. The actions taken based on, the movements of a user's finger (hand, device or the like) may depend on the operational mode of the computer and any applications that may be running thereon.

Hardware and/or software processing may be utilized to analyze the data from the proximity sensors to determine the location and movement of the device (e.g., finger, hand, wand) with respect to the display. The proximity sensors may provide the data to a processor to analyze the data in order to detect and/or recognize movements and/or objects within the coverage zone 340. As noted above, the actions taken based on the detection/recognition may depend on the operational status of the computer.

According to one embodiment, the use of the proximity sensors could allow the computer to act as a 3D scanner. Based on the defined areas that are determined to contain the object processing could be performed to get a sense for the size and shape of the object. It should be noted that the 3D image generated may be limited to surface of the object facing the display and the keyboard.

According to one embodiment, the generation of a 3D image could be used for authentication and/or security access. For example, when a user attempts to log-on to the computer, the computer may utilize the proximity sensors to generate a 3D image of, for example the users hand or face. The generated 3D image may be compared to an authenticated 3D image to determine if access should be granted or not. Specific movements of, for example as users finger through the coverage area may also be used for authentication and/or security access. For example, in order to authenticate a user the detected movements of the users finger may be compared to stored moves. The authentication moves may be for example the swiping of a finger from a upper left front portion of the coverage area to the lower right back portion.

As one skilled in the art would recognize the more proximity sensors utilized the finer the granularity of the 3D user interface. Accordingly, the use of the proximity sensors for 3D scanning and/or user authentication may require a minimum amount of sensors per area.

Figure 5:
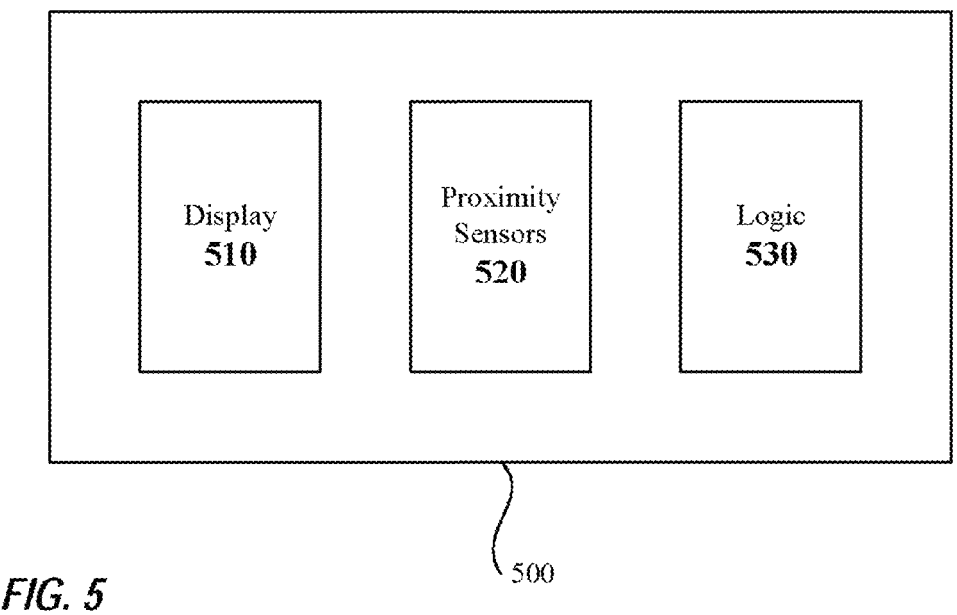
FIG. 5 illustrates an example system diagram for a laptop computer providing a 3D user interface, according to one embodiment.

FIG. 5 illustrates an example system diagram for a laptop computer 500 providing a 3D user interface. The computer 500 may include a display 510, a plurality of proximity sensors 520, and logic 530. The display 510 is to present information. The proximity sensors 520 are to detect the presence of items (e.g., users finger, users hand, stylus) in relation thereto. The logic 530 is to process the input from the proximity sensors. The logic 530 may be hardware and/or software logic. The logic 530 may be one or more processors utilized within the computer 500.

The logic 530 may be configured to define a plurality of coverage areas corresponding to intersections of the proximity sensors. The logic 530 may be configured to indicate presence of an object in a coverage area in response to detection by the proximity sensors associated therewith. The logic 530 may be configured to allow a user to identify an item on the display 510 for selection by placing an object within a corresponding coverage area. The logic 530 may be configured to highlight the item identified for selection. The logic 530 may be configured to select the item in response to movement of the object toward the display. The logic 530 may be configured to identify an action to be taken on the display in response to detection of movement of an object through one or more of the coverage areas. The logic 530 may be configured to generate a 3D image of an object in response to detection of the object in one or more coverage areas. The logic 530 may be configured to utlze the 3D image to perform authentication.

The 3D user interface has been described with specific reference to a laptop computer but is not limited thereto. Rather, the 3D interface could be utilized with any apparatus that includes a display and a keyboard extending therefrom, such as a desktop computer, certain tablet computers with snap on keyboards such as the Surface™ by Microsoft®, certain wireless phones, and/or certain personal digital assistants (PDAs) and the like. Furthermore, the second surface is not limited to a keyboard. Rather the other surface may be any type of user interface or device that extends from a display. For example, the second surface may be another display or may be a cover for the device that extends outward when the cover is opened. For example, a 3D interface could be provided for a tablet computer by utilizing a protective cover for the device. The proximity sensors within the protective cover would need to provide data to the computer so some type of communications interface would be required.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus, comprising:
    a first body having a length and a height;
    a second body having a length and a depth, wherein the length of the second body is substantially the same as the length of the first body, wherein the first body and the second body are configured to be arranged substantially orthogonal to each other such that they are aligned along their lengths, and wherein the first body extends substantially orthogonally from the second body by the height of the first body and the second body extends substantially orthogonally from the first body by the depth of the second body;
    a display supported by the first body;
    a first array of proximity sensors configured to be interspersed throughout a two dimensional (2D) area of the first body, including a viewing surface of the display, defined by the length and the height of the first body, wherein the first array of proximity sensors are capable of detecting objects within the 2D area of the viewing surface of the display that are within a first distance from the viewing surface of the display, wherein the first distance is at least the depth of the second body; and
    a second array of proximity sensors configured to be interspaced throughout a 2D area of the second body defined by the length and the depth of the second body, wherein the second array of proximity sensors are capable of detecting objects with the 2D area of the second body that are within a second distance of the second body, wherein the second distance is at least the height of the display, wherein an overlap in detection of objects between the first array and the second array of proximity sensors define a coverage zone substantially between the first body and the second body that acts as a three dimensional (3D) user interface for the apparatus, wherein the coverage zone is divided into a plurality of coverage areas, wherein each coverage area of the plurality of coverage areas is defined by an intersection between a sensor of the first array and a sensor of the second array, and wherein each coverage area is associated with a portion of the viewing surface of the display.

2. The apparatus of claim 1, further comprising logic at least a portion of which is in hardware, the logic configured to define the plurality of coverage areas.

3. The apparatus of claim 2, wherein the logic is further configured to indicate presence of an object in a coverage area in response to detection by the proximity sensors associated therewith.

4. The apparatus of claim 3, wherein the logic is further configured to allow a user to identify an item on the display for selection by placing an object within a corresponding coverage area.

5. The apparatus of claim 4, wherein the object is a user's finger.

6. The apparatus of claim 4, wherein the object is a user's hand.

7. The apparatus of claim 4, wherein the object is a pointing device.

8. The apparatus of claim 4, wherein the logic is further configured to highlight the item identified for selection.

9. The apparatus of claim 8, wherein the logic is further configured to select the item in response to movement of the object toward the display.

10. The apparatus of claim 3, wherein the logic is further configured to identify an action to be taken on the display in response to detection of movement of an object through one or more of the coverage areas.

11. The apparatus of claim 3, wherein the logic is further configured to generate a 3D image of an object in response to detection of the object in a plurality of coverage areas.

12. The apparatus of claim 11, wherein the logic is further configured to utilize the 3D image to perform authentication.

13. The apparatus of claim 11, wherein the object is a user's hand.

14. The apparatus of claim 11, wherein the object is a user's head.

15. The apparatus of claim 1, wherein
    the first array of proximity sensors is arranged in a plurality of rows and a plurality of columns;
    the second array of proximity sensors is arranged in a plurality of rows and a plurality of columns.

16. The apparatus of claim 15, wherein the plurality of rows of proximity sensors in the first array are aligned relative to the plurality of rows of proximity sensors in the second array.

17. The apparatus of claim 15, wherein the plurality of columns of proximity sensors in the first array are aligned relative to the plurality of columns of proximity sensors in the second array.

18. The apparatus of claim 1, wherein the second body is a user interface device.

19. The apparatus of claim 18, wherein the user interface device is a keyboard.

20. The apparatus of claim 1, wherein the second body extends from a lower edge of the first body.

21. The apparatus of claim 1, wherein the second body extends from a side edge of the first body.

22. An apparatus, comprising:
a display having a length and a height;
a user interface having a length and a depth, wherein the user interface is configured to extend away from an edge of the display, and wherein the length of the user interface is substantially the same as, and aligned with, the length of the display;
a first array of proximity sensors configured to be interspersed throughout a two dimensional (2D) area of the display defined by the length and height thereof including a viewing surface of the display, wherein the first array of proximity sensors are capable of detecting objects within the 2D area of the viewing surface of the display that are within a first distance from the viewing surface, wherein the first distance is approximately the depth of the user interface;
a second array of proximity sensors configured to be interspersed throughout a 2D area of the user interface defined by the length and the depth of the user interface, wherein the second array of proximity sensors are capable of detecting objects with the 2D area of the user interface that are within a second distance of the user interface, wherein the second distance is approximately the height of the display, wherein an overlap in detection of objects between the first array and the second array of proximity sensors define a coverage zone substantially between the display and the user interface, wherein the coverage zone is divided into a plurality of coverage areas, wherein each coverage area of the plurality of coverage is defined by an intersection between a sensor of the first array and a sensor of the second array, and wherein each coverage area is associated with a portion of the display; and
logic at least a portion of which is in hardware configured to detect three dimensional (3D) user interactions within the coverage zone associated with the display based at least in part on input from the first array of proximity sensors and the second array of proximity sensors.

23. The apparatus of claim 22, wherein the logic is further configured to define the plurality of coverage areas corresponding to the intersections of the proximity sensors of the first array and proximity sensors of the second array.

24. The apparatus of claim 23, wherein the logic is further configured to indicate presence of an object in a coverage area in response to detection by the proximity sensors associated therewith.

25. The apparatus of claim 23, wherein the logic is further configured to identify selection of an item on the display in response to placement of an object within a corresponding coverage area.

26. The apparatus of claim 25, wherein the object includes at least one selected from a list comprising a user's finger, a user's hand, and a pointing device.

27. The apparatus of claim 25, wherein the logic is further configured to highlight the item identified for selection.

28. The apparatus of claim 25, wherein the logic is further configured to identify selection of the item in response to movement of the object toward the display.

29. The apparatus of claim 23, wherein the logic is further configured to identify an action to be taken on the display in response to detection of movement of an object through one or more of the coverage areas.

30. The apparatus of claim 23, wherein the logic is further configured to generate a 3D image of an object in response to detection of the object in a plurality of coverage areas.

31. The apparatus of claim 30, wherein the logic is further configured to authenticate a user utilizing the 3D image.

* * * * *